United States Patent [19]

Boes

[11] Patent Number: 4,858,891

[45] Date of Patent: Aug. 22, 1989

[54] FIBERGLASS FENCE POST OR COLUMN STRUCTURE

[76] Inventor: Roger T. Boes, 3713 Bixler St., Metairie, La. 70001

[21] Appl. No.: 251,914

[22] Filed: Sep. 30, 1988

[51] Int. Cl.$^4$ ............................................. E04H 17/14
[52] U.S. Cl. ..................................... 256/19; 256/66; 256/DIG. 5
[58] Field of Search .................... 256/19, 66, DIG. 5; 249/143; 264/275

[56] References Cited

U.S. PATENT DOCUMENTS

| | | |
|---|---|---|
| 58,300 | 9/1866 | Rose . |
| 250,046 | 11/1881 | Rogers . |
| 264,883 | 9/1882 | Johnston ........................ 256/DIG. 5 |
| 301,108 | 7/1884 | Furness . |
| 754,119 | 3/1904 | Brooks . |
| 760,882 | 5/1904 | Litzinger ................................ 256/66 |
| 1,204,187 | 11/1916 | Pickrell .................................. 256/66 |
| 1,316,893 | 9/1919 | Hohaus . |
| 2,027,493 | 1/1936 | Thilborger . |
| 2,073,947 | 3/1937 | Sander . |
| 2,766,015 | 10/1956 | Farmer . |
| 3,339,895 | 9/1967 | Kusel et al. . |
| 3,711,066 | 1/1973 | Niemiec . |
| 3,801,072 | 4/1974 | Newberry, Jr. . |
| 4,053,140 | 10/1977 | Clemens et al. . |
| 4,060,222 | 11/1977 | Pitkin et al. . |
| 4,324,388 | 4/1982 | Klaser . |
| 4,357,000 | 11/1982 | Tisbo et al. . |
| 4,540,160 | 9/1985 | Zanavich et al. . |

*Primary Examiner*—Andrew V. Kundrat
*Attorney, Agent, or Firm*—C. Emmett Pugh

[57] ABSTRACT

Device and method of fabrication for producing authentic appearing reproductions of fence posts or columns of an ornamental nature, such as those exemplified in the spanish wrought iron designs of the 18th and 19th century. The present invention relates to an easily installed ornamental fence post or column composed of fiberglass or the like and having a reinforced interior structure of steel or the like, as well as a new and unique method of molding these structures.

2 Claims, 3 Drawing Sheets

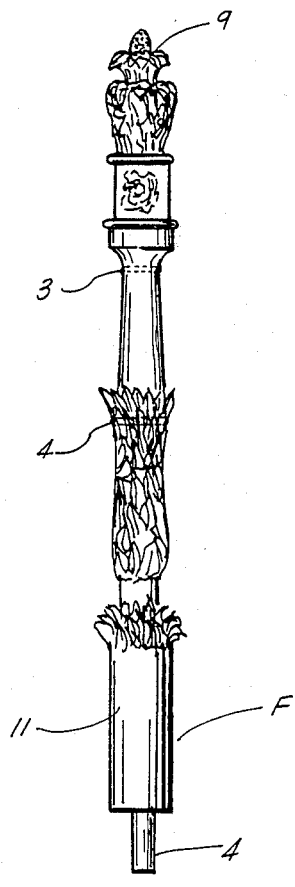
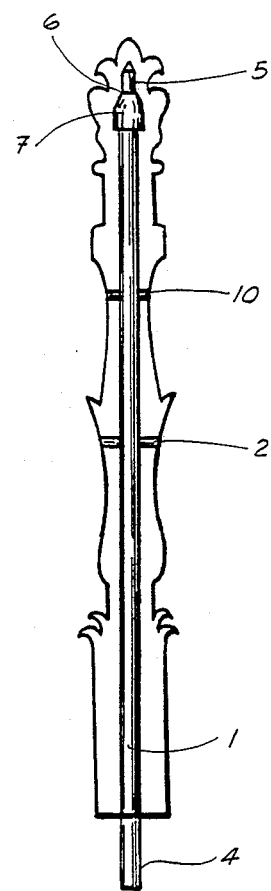
FIG. 1  FIG. 2
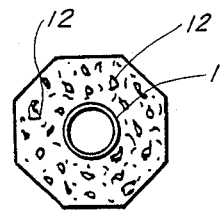
FIG. 3

FIBERGLASS FENCE POST OR COLUMN STRUCTURE

BACKGROUND OF THE INVENTION

1. Field of Invention

The present invention relates to fence posts and columns of an ornamental nature, such as those exemplified in the spanish wrought iron designs of the 18th and 19th centuries, and more particularly to a device and method of fabrication for an easily installed ornamental fence post or column composed of fiberglass or the like and having a reinforced interior structure of steel or the like.

2. Prior Art and General Background

The ornamental fence posts and/or columns exemplified in the past typically were constructed of cast iron or the like. These fences required constant painting to prevent rust and were surprisingly fragile due to the brittle nature of cast iron. In addition, the costs of fabricating an ornamental iron fence post or column has increased dramatically over the years, to the point of making them prohibitively expensive.

While the prior art apparently does not anticipate the present invention, it does teach various devices and methods regarding the utilization of a material other than that traditionally contemplated for the construction of fences and fence posts or columns.

Prior patents which may be of interest are listed below:

| Pat. No. | Patentee(s) | Year of Issue |
| --- | --- | --- |
| 58,300 | S. H. Rose | 1866 |
| 250,046 | T. Rogers | 1881 |
| 301,108 | A. W. Furness | 1884 |
| 754,119 | J. C. Brooks | 1904 |
| 1,316,893 | G. E. Hohaus | 1919 |
| 2,027,493 | W. J. Thilborger | 1936 |
| 2,073,947 | J. A. Sander | 1937 |
| 2,766,015 | W. R. Farmer | 1956 |
| 3,339,895 | E. J. Kusel et al | 1967 |
| 3,711,066 | Niemiec | 1973 |
| 3,801,072 | Newberry, Jr. | 1974 |
| 4,053,140 | Clemens et al | 1977 |
| 4,060,222 | Pitkin et al | 1977 |
| 4,324,388 | Klaser | 1982 |
| 4,357,000 | Tisbo et al | 1982 |
| 4,540,160 | Zanavich et al | 1985 |

Patent 3,711,066 issued 1973 and entitled "Snap Lock Plastic Fencing" teaches a plurality of adjacent fence sections "to produce decorative and protective borders for lawns, gardens, and flower beds". The sections are composed integrally of molded plastic and include at least two stake members for easy installation.

Patent 4,060,222 issued in 1977 and entitled "Prefabricated Fencing System" teaches an easily installed, prefabricated fencing structure composed of plastic and includes a "rod driven axially through the post into the ground to eliminate the need for post hole digging".

The above cited patents contemplate plastic fences for placement on lawns, pastures and the like and do not incorporate, to a significant degree, non-plastic components for structural stability in the manner contemplated in the present invention. Additionally, the fabrication process as contemplated for in the prior art is obviously distinguishable from the present invention.

Patent 3,801,072 issued 1974 and entitled "Fence Panel" teaches a fiberglass fensing panel which "duplicates the physical appearance of the original panel on one face and includes an integrally formed mounting frame on the opposite face". The panels are supported between the conventional fence posts to form a fiberglass fence having the "physical appearance of a conventional fence".

This patent is likewise distinguishable from the present invention, which teaches a fence post and not a panel, and has a new and unique means of fabrication utilizing latex molds, as well as integral structural reenforcement means utilizing steel tubing or the like.

3. General, Summary Discussion of the Invention

The present invention overcomes these prior art problems by providing a system which is highly reliable, relatively economical and very cost effective.

The present invention comprises a new and unique method and apparatus in the form of an ornamental fence post or column utilizing steel reinforcement means, and having an exterior composition of molded fiberglass and resin or the like. The mold for the post or column is fabricated by utilizing a model which may in fact be the wrought iron fence post or column which the maker seeks to duplicate.

An enumerated above, the present invention has many desirable characteristics over traditional wrought iron fencing. For example, the present invention does not require painting, as the fiberglass resin can be dyed the desired color. Further, the utilization of the resin compound in lieu of iron drastically decreases the cost of materials, fabrication and erection and has been found to actually have an increased durability over iron.

In erecting a wrought iron fence, one must weld together the various components; this can be a very costly and time consuming process on its own. With the present invention, one merely bolts the respective components together utilizing standard nuts and bolts. Further, the fiberglass fence post and/or column, with its steel reenforcement, may be mounted in cement, just as its predecessor was.

Yet, the present invention has the same appearance of the traditional wrought iron which it imitates; the intricacy of the design of the wrought iron model is duplicated with the molding process. The result is that one may copy an existing design for a wrought iron post or column, and thereby construct a fiberglass, steel reenforced version.

It is thus an object of the present invention to provide a fiberglass fence post or column which is durable, easily fabricated, cost effective, and does not require periodic maintenance.

It is a further object of the present invention to provide a fiberglass fence post or column which is attractive in appearance and which duplicates traditional wrought iron designs in an authentic manner.

It is further an object of the present invention to provide a fiberglass fence post or column which is reinforced with steel or the like in such a manner as to further increase its structural stability.

It is still further an object of the present invention to provide a molding process for fiberglass fence posts or columns which duplicates traditional wrought iron designs and provides for a manner in which to incorporate steel reinforcement.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 1 is a side view of the preferred embodiment of the fiberglass fence post or column of the present invention illustrating the steel reenforcement means emanating from the base and the ornamental character of the invention.

FIG. 2 is a side, cutaway view of the preferred embodiment of the present fiberglass fencepost or column of the present invention illustrating the internal steel reinforcement means and internal dowel pins to their removing.

FIG. 3 is a top cross-sectional view of the fiberglass fence post or column of the embodiment of the present invention indicating the resin composition fiberglass including roving pieces.

DETAILED DESCRIPTION OF THE PREFERRED, EXEMPLARY EMBODIMENT(S)

Figure 4:
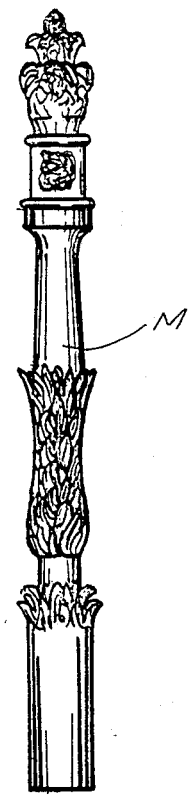
FIG. 4 is a side view of the exemplary model of the present invention, an 18th century ornamental cast iron fence post.

As can be seen in FIGS. 1 and 2, the fencepost or column F of the preferred, exemplary embodiment of the present invention includes means for increasing the structural stability of the fencepost or column in the form of a tubular or solid steel member 1, having a diameter of approximately two inches, molded in the center of the fencepost or column F. Steel member 1 extends approximately one foot exterior to the base 4 of the fencepost or column F in order to provide a stable means of anchoring the fencepost or column F in concrete or the like.

Dowels, 2, 10 of wood or the like are placed in designated areas of the fencepost or column F during the molding process in order to provide holes 3, 4 for connection of hardware to the posts or columns such as gates, fence panels and the like. After molding the dowels 2, 10 are removed so that the holes 3, 4 may be utilized.

A steel extension 7 is weldingly or threadingly affixed to the top of steel member 1 for further reinforcement at point 8. This member 7 includes a steel point 5 at the top of member 7 at point 6; the steel point 5 has a length of approximately two inches and a width substantially less than steel member 1 in order to reinforce the top area 9 of the fencepost or column F.

As is illustrated in FIG. 3, the portion of fencepost or column F encompassing steel member 1 from base 4 to top 9 is comprised mostly of fiberglass resin compound 11 interspersed with bits of fiberglass roving 12. These bits of roving 12 add strength to the resin compound 11.

Figure 5:
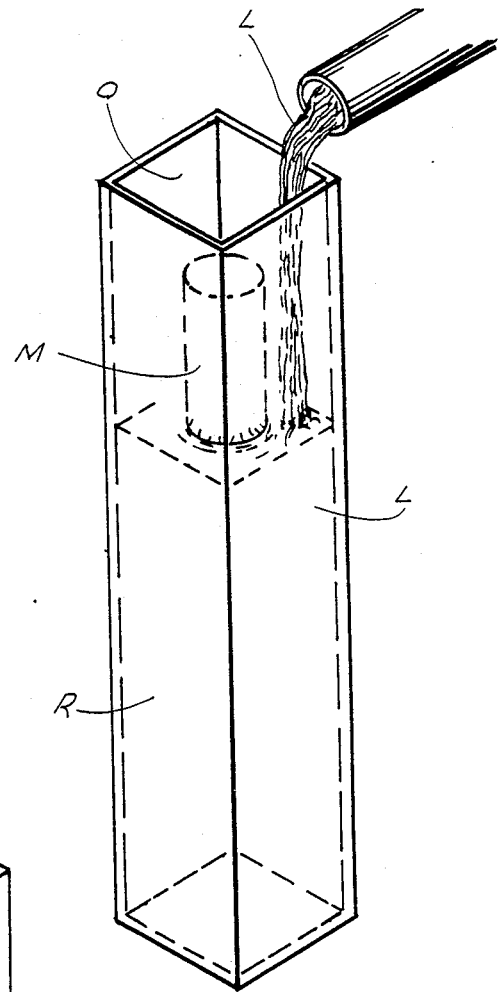
FIG. 5 is a side, perspective view of the mold container of the present invention, illustrating the latex molding compound being poured into the retainer, and further illustrating the base of the model in phantom line.
Figure 6:
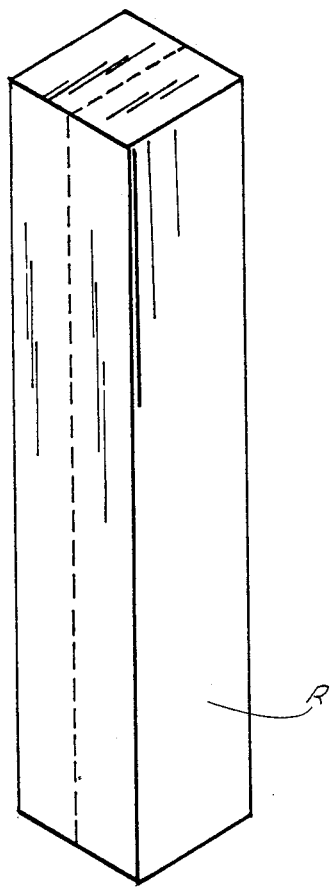
FIG. 6 is a side, perspective view of the mold container of the present invention.

The present invention utilizes a molding process in which the steel member 1 is positioned in the center of the mold. As illustrated in FIGS. 4-6, the mold of the present embodiment comprises two pieces, and is fabricated as follows:

1. a suitable "model" M, generally in the form of an existing iron fencepost or column, is selected;
2. this model is then placed in a rectilinear mold retainer R, which is cut lengthwise in order to provide a means of removal;
3. the mold retainer is sealed such that only that end O to which the base of the model fencepost or column is closest to open;
4. the mold is then stood vertical to the ground, with the open end up;
5. as may be seen in FIG. 5, the fencepost or column model M is centered in the mold retainer;
6. the mold retainer R is then vibrated by a vibrator in order to cause the latex L to permeate all available space in the mold and to release trapped air bubbles;
7. a mold making compound such as latex L or the like is poured in its liquid state into the mold retainer, surrounding the model;
8. the mold retainer is left in its vertical position undisturbed until the latex cures into its solid state, shown in FIG. 6;
9. the mold retainer is then carefully opened, simultaneously cutting the latex, such that a two piece mold, contained in the mold retainer, is formed of the fencepost or column; and
10. the fencepost or column model is then carefully removed.

Figure 7:
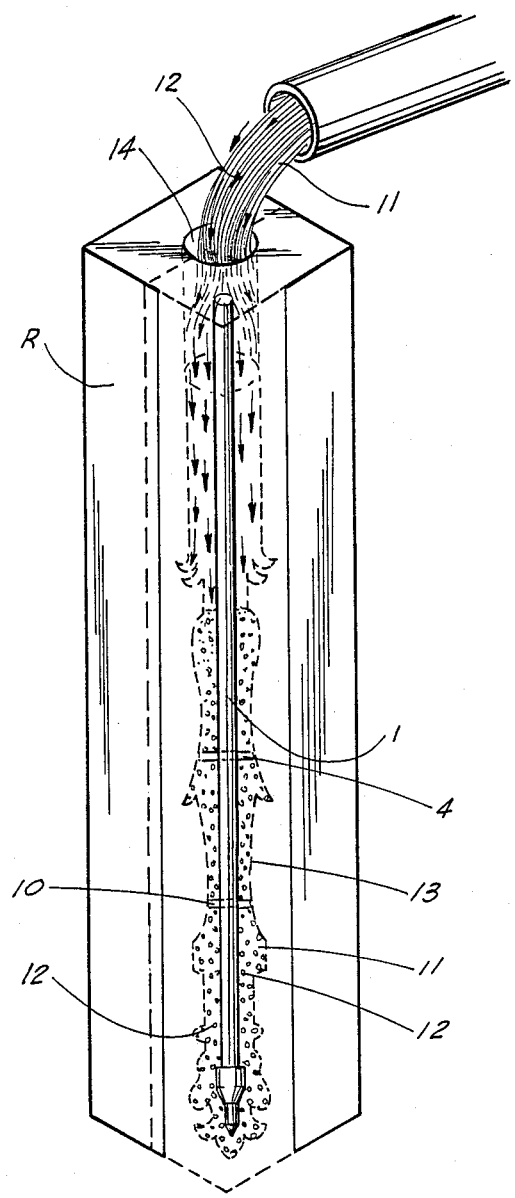
FIG. 7 is a side, perspective view of the mold container of the present invention illustrating a latex compound being poured into the mold, the steel reinforcement means and dowel pins illustrated in the cutaway portion.

In preparing the fiberglass fencepost or column illustrated in FIG. 7, the following steps are followed:
1. the two piece mold 13 is sealed such that only that end which will be the base of the fencepost or column is open;
2. the mold is then stood vertical to the ground, with the open end 14 up;
3. the steel member 1 is placed lengthwise in the mold and centered accordingly;
4. a fiberglass compound including resin 11 and bits of roving 12 is poured in its liquid state into the mold retainer, surrounding the steel member 1;
5. the mold retainer R is then vibrated by a vibrator in order to cause the fiberglass compound 11, 12 to permeate all available space in the mold and to release trapped air bubbles;
6. the mold is left in its vertical position undisturbed until the fiberglass compound cures into its solid state;
7. the mold retainer is then carefully opened; and
8. the fencepost or column model is then carefully removed.

It is noted that the fiberglass compound may be colored resin utilizing a dye such as colortrend, manufactured by Nuodex, in lieu of painting. The fiberglass exterior will thereby require little or no maintenance once it is installed.

The fiberglass resin used in the exemplary embodiment can be, for example, polyester resin #301; while the roving or chopped fiberglass can be, for example, polyester fiber #1.

The latex used in making the mold can be, for example, silastic J RTV manufactured by Dow Corning.

It is also noted that the fiberglass fencepost or column, once removed from the mold, may require some sanding and filling in order to cure any imperfections that may have occurred during the molding process.

The embodiment(s) described herein in detail for exemplary purposes are of course subject to many different variations in structure, design, application and methodology. Because many varying and different embodiments may be made within the scope of the inventive concept(s) herein taught, and because many modifications may be made in the embodiment(s) herein detailed in accordance with the descriptive requirements of the law, it is to be understood that the details herein are to be interpreted as illustrative and not in a limiting sense.

What is claimed is:

1. A fence of column structure, comprising:
    an internal support, said support including
        steel tubing or the like positioned longitudinally through the center of said structure,
        an upper extension having a diameter less than that of said tubing, the length of said extension being at least two inches, and
        a steel mounting member affixed to said support juxtaposed between said upper extension and said tubing; and
    an exterior of fiberglass compound moldingly affixed around said support, said compound including
        fiberglass resin, and
        bits of fiberglass roving.

2. The fence or column structure of claim 1, wherein the internal steel support comprises steel tubing protruding approximately one foot from the base of said structure.

* * * * *